United States Patent [19]

Borders

[11] Patent Number: 4,625,448

[45] Date of Patent: Dec. 2, 1986

[54] FISHING LURE WITH IMPROVED LINE ATTACHMENT

[76] Inventor: Fred C. Borders, 15801 Empire La., Westminster, Calif. 92683

[21] Appl. No.: 741,897

[22] Filed: Jun. 6, 1985

[51] Int. Cl.[4] ........................................... A01K 85/00
[52] U.S. Cl. .................... 43/42.11; 43/42.13; 43/42.19; 43/42.49
[58] Field of Search ................ 43/42.13, 42.14, 42.19, 43/42.11, 42.49

[56] References Cited

U.S. PATENT DOCUMENTS

| | | | |
|---|---|---|---|
| 2,397,968 | 4/1946 | Lind | 43/42.19 |
| 3,546,804 | 12/1970 | Woolums | 43/42.11 |
| 4,003,154 | 1/1977 | Carver | 43/42.13 |
| 4,209,932 | 7/1980 | Pate | 43/42.13 |
| 4,329,804 | 5/1982 | Brown | 43/42.13 |

*Primary Examiner*—Gene P. Crosby
*Attorney, Agent, or Firm*—Holman & Stern

[57] ABSTRACT

A spinner bait or buzz bait-type fishing lure having a line-attachment portion between respective arms of the lure is provided with a line securing bushing freely rotatably carried on the line-attachment portion of the lure. The line is secured around the bushing rather than directly around the shaft of the lure so as to minimize frictional wear on the line when the lure twists relative to the line.

5 Claims, 5 Drawing Figures

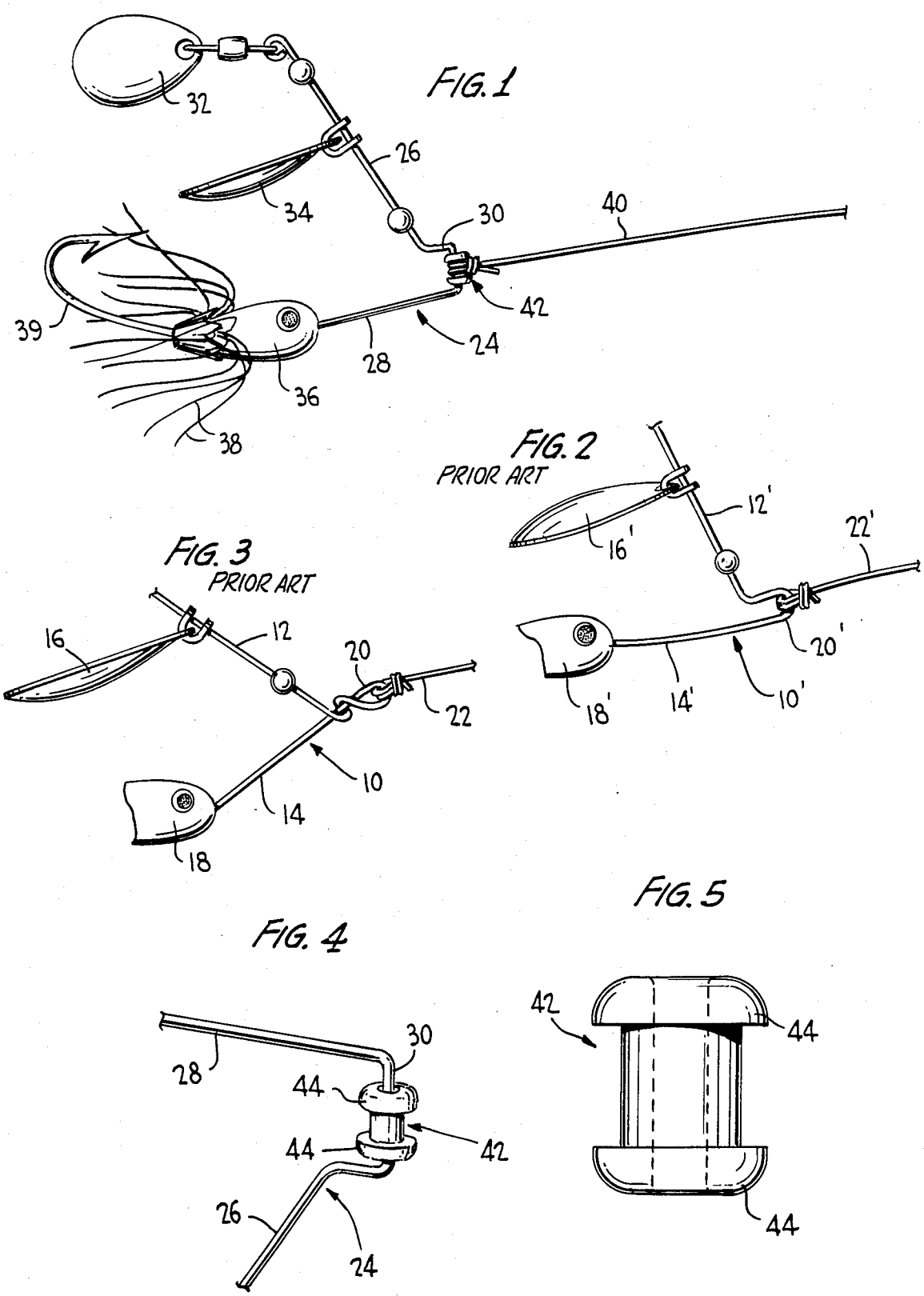

FISHING LURE WITH IMPROVED LINE ATTACHMENT

BACKGROUND AND SUMMARY OF THE INVENTION

This invention relates to fishing lures and the like, particularly spinner bait or buzz bait-type lures comprising a wire shaft with mutually angled arms, one arm of which carries a spinner, spoon or the like, and the other arm of which carries a ribboned or like skirt concealing a hook. Generally, in lures of this type, the junction between the arms of the wire shaft is formed as an eye for direct attachment of a fishing line. The eye may be of an open type, or the shaft may be twisted to form a closed eye. In either case, the line is generally knotted directly around the eye. This method of attachment of the line, however, may cause problems. For example, when a spinner bait is cast, the line sometimes wraps around the eye producing friction tending to fray or weaken the line. The line may also be weakened by friction caused by rubbing on the eye as the lure pivots when a fish is hooked. Accordingly, it is an object of the invention, to provide an improved form of line attachment which is less subject to these problems.

In accordance with the invention, the attachment eye of a fishing lure as described, is provided with a surrounding sleeve or bushing free to rotate on the wire, so that the fishing line can be tied around the bushing rather than being tied directly around the wire. Thus, forces tending to rotate the lure relative to the fishing line will merely rotate the lure in the bushing and will not create friction tending to weaken the line.

Preferably, the bushing may be in the form of a spool with flanged ends to promote retention of the line on the bushing, and the bushing may be made from a variety of materials including brass, stainless steel, aluminum and hard plastic.

Additional features and advantages of the invention will be apparent from the ensuing description and claims read in conjunction with the attached drawings.

BRIEF DESCRIPTION OF DRAWINGS

FIG. 1 is a general view of a fishing lure in accordance with the invention with an attached fishing line, FIGS. 2 and 3 are partial views similar to FIG. 1 of prior art-type lures with attached lines, FIG. 4 is an enlarged view of a line-attachment eye portion of the lure shown in FIG. 1, and FIG. 5 is an elevational view of a line-attachment bushing used in the lure shown in FIGS. 1 and 4.

DESCRIPTION OF PREFERRED EMBODIMENT

Referring initially to FIGS. 2 and 3, there are shown portions of a pair of conventional spinner bait-type lures having wire shafts 10 or 10' bent to form respective angled arms 12, 12' and 14, 14'. The arms carry in each case respective spinners 16, 16' and lure bodies 18, 18', the latter having respective skirts concealing hooks, not shown. At the junction of the respective arms, each lure is formed with a line-attachment eye 20, 20', onto which is directly tied a respective fishing line 22, 22'. Eye 20 is of a closed type formed by twisting shaft 10, while eye 20' is of an open type formed by suitably bending shaft 10'. In either case, the respective lines 22, 22' are subject to frictional wear as aforesaid by twisting of the lures.

FIGS. 1 and 4 show a similar spinner bait-type lure in accordance with the invention comprising a wire shaft 24 bent to form angled arms 26, 28 with an open eye 30 therebetween, spinners 32, 34 on arm 26 and a lure body 36 with a skirt 38 and a concealed hook 39 on arm 28. In this case, to avoid frictional wear on fishing line 40, the eye portion 30 of shaft 24 is provided with a spool-shaped bushing 42 freely rotatably mounted thereon, the bushing having flanged ends 44. The bushing may be of a metal or plastic, as aforesaid, and line 40 is tied around the bushing rather than directly around the shaft as in the prior art lures. Thus, twisting of the lure does not produce frictional rubbing forces on the line tending to weaken same, since the lure simply twists in the bushing.

A bushing, as shown, may also be applied to a lure having a closed eye and the invention may also be applied to lures, baits and hooks in general without being confined to the particular types of lures specifically described herein.

While only a preferred embodiment of the invention has been described in detail, the invention is not limited thereby and modifications can be made within the scope of the attached claims.

I claim:

1. In a fishing lure comprising a wire-type shaft bent to form mutually angled arms for receiving a spinner or the like and a concealed hook respectively, the arms defining a line-attachment portion at the junction therebetween, the improvement comprising a bushing with a continuous cylindrical outer surface and a throughbore freely rotatably mounting the bushing on said portion of the shaft with said cylindrical outer surface surrounding and spaced from said shaft whereby the line may be tied around the cylindrical outer surface of the bushing coaxially with said portion of the shaft rather than directly around the shaft.

2. The invention of claim 1 wherein the bushing is in the form of a spool with end flanges for line retention.

3. A fishing lure comprising a wire-type shaft having mutually angled arms defining a line-attachment portion therebetween, a spinner or the like on one arm, a concealed hook on the other arm, and means for minimizing rubbing friction on a fishing line tied to said portion of the shaft when the lure twists relative to the line comprising a freely rotatable bushing with a cylindrical outer surface surrounding and spaced from said shaft and an axial throughbore received on said portion of the shaft and around which cylindrical outer surface the line is tied coaxially with said portion of the shaft.

4. The invention of claim 3 wherein the bushing has flanged ends.

5. The invention of claim 4 wherein the bushing is made from a material selected from a group consisting of a metal and a plastic.

* * * * *